March 7, 1944.   B. J. YANCHENKO ET AL   2,343,355
TURN SIGNAL SWITCH
Filed Oct. 29, 1941   3 Sheets-Sheet 1

INVENTORS
BASIL J. YANCHENKO
HARRY A. STEELE
BY
Bohleber, Fassett & Montstream
ATTORNEYS March 7, 1944.   B. J. YANCHENKO ET AL   2,343,355
TURN SIGNAL SWITCH
Filed Oct. 29, 1941   3 Sheets-Sheet 2
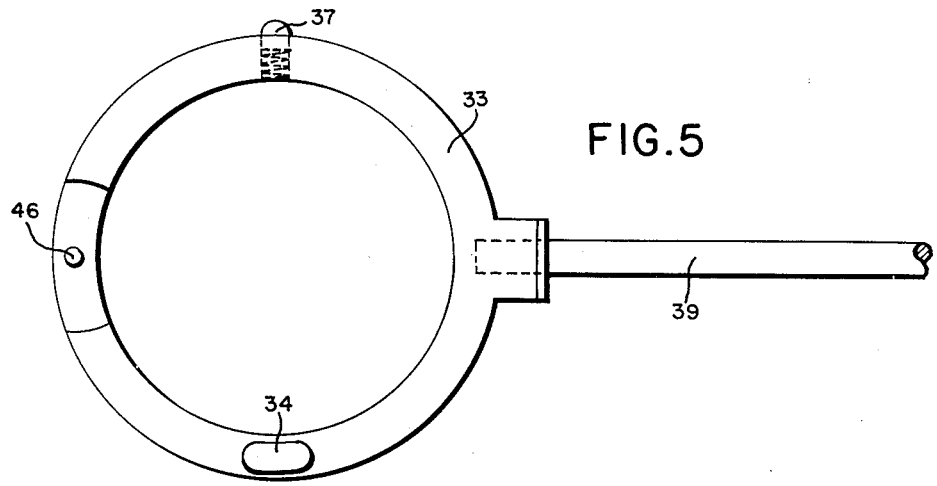
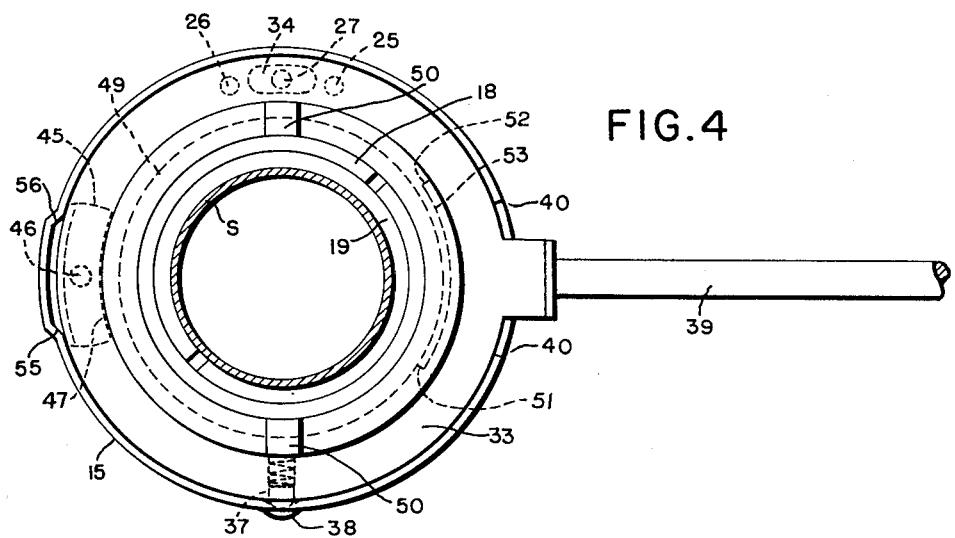
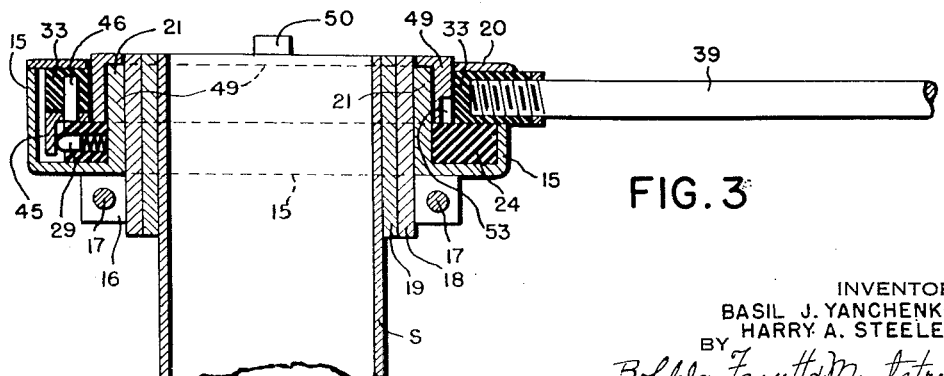
INVENTORS
BASIL J. YANCHENKO
HARRY A. STEELE
BY
Bohleberg Fassett & Montstream
ATTORNEYS

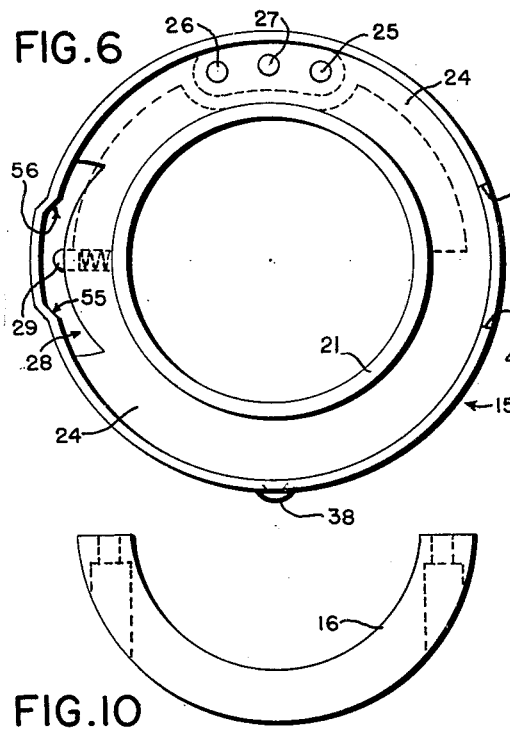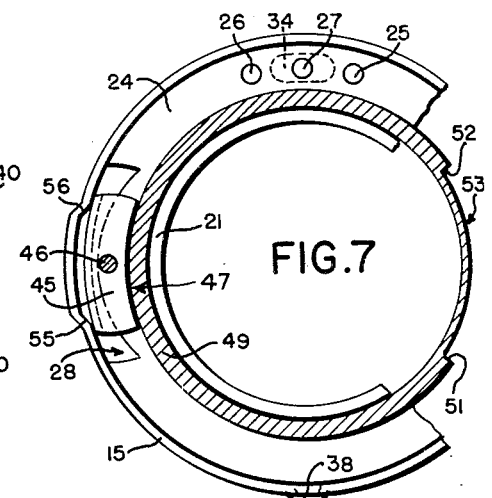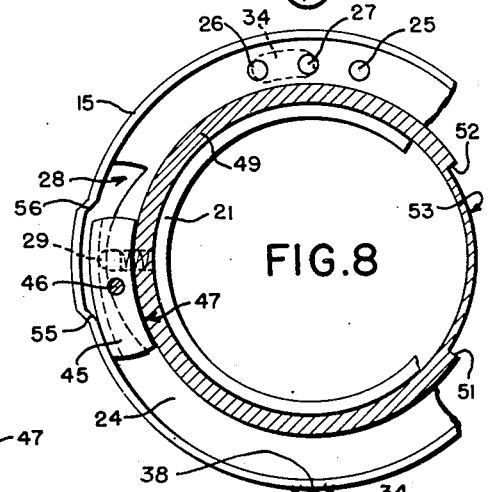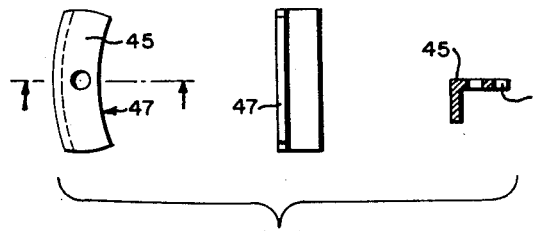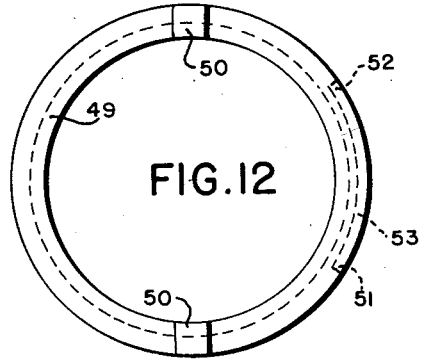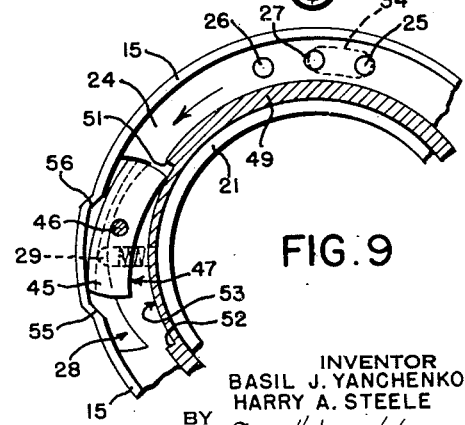

Patented Mar. 7, 1944

2,343,355

UNITED STATES PATENT OFFICE 2,343,355

TURN SIGNAL SWITCH

Basil J. Yanchenko and Harry A. Steele, Syracuse, N. Y., assignors to Protectall Motor Signal, Inc., Syracuse, N. Y., a corporation of Illinois Application October 29, 1941, Serial No 416,964

12 Claims. (Cl. 200—59)

The invention relates to an electric switch adapted particularly to control a turn signal for a vehicle. Such a switch is customarily mounted upon the steering post of an automotive vehicle adjacent its steering wheel and flashes a signal to indicate that the car operator or driver intends to turn the vehicle either to the right or to the left.

The turn signal switch is manually manipulated by the driver to indicate the direction of his turn, after which the turn is made, and then when the steering wheel is rotated in a reverse direction to straighten out the vehicle, the switch is automatically thrown to off or unconnected position and thereby extinguishes the turn signal.

An object of the invention is to produce a new construction in a turn signal switch of the type which automatically returns to its off position upon reverse rotation of the steering wheel to straighten out the vehicle, and to provide a normally disconnected or inoperative driving connection of new and simplified form between the steering wheel and the switch for the semi-automatic control of the vehicle turn signal.

Other objects of the invention will be more apparent from the following description taken in connection with the accompanying drawings, illustrating a preferred embodiment of the invention, in which:

Figure 3 is a longitudinal section through the turn signal switch taken on line 3—3 of Figure 2.

Figure 4 is a plan view of the switch with the cover of the casing removed to show a movable switch element therein.

Figure 5 is a plan view of the movable element of the switch which is manually manipulated to the right or left in order to indicate a right or left turn.

Figure 6 is a plan view within the switch casing, somewhat similar to that illustrated in Figure 4, but with the movable element of the switch removed from the casing.

Figure 7 is a view similar to Figure 6, but showing a double acting pawl in its neutral position when the switch is in off or unconnected open position, as indicated by the open position of the switch blade with respect to the switch contacts.

Figure 8 is a view similar to Figure 7, but shows the double acting pawl moved away from neutral position, by reason of manually throwing the switch to one of its connected positions, as indicated by the switch blade electrically connecting two of the switch contacts.

Figure 9 shows the position of the double acting pawl when the switch has been moved manually to the other position from that of Figure 8 and reverse rotation of the steering wheel is taking place, so that a driving connection is about to be established between the steering wheel and the switch in return direction only so that the switch may be automatically returned to off position.

Figure 10 shows the securing or mounting half ring clamp by which the switch is secured to the steering column of the vehicle.

Figure 11 shows details of the double acting pawl.

Figure 12 is a plan view of the driving means or ring which is connected with the steering wheel for rotation thereby and forms part of the driving connection for returning the switch to its off or unconnected position.

Figure 1:
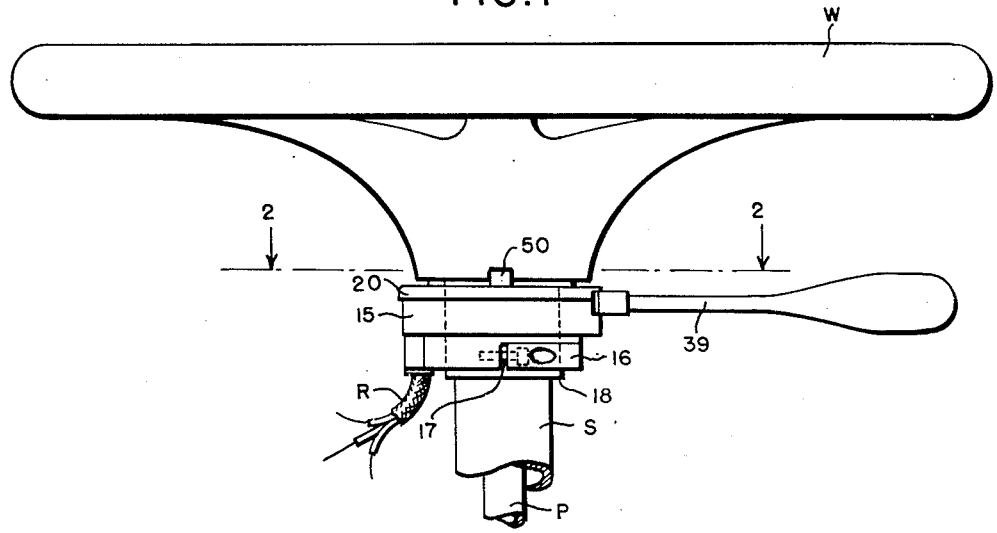
Figure 1 is a side elevation of a steering wheel with the turn signal switch mounted upon the stationary tubular steering column enclosing the steering post or shaft to which the wheel is fixed.

The switch, when used as a turn signal switch, is mounted upon the stationary tubular steering column housing S of a vehicle. The steering wheel W is fixed to a steering post or shaft P enclosed within the housing S, and the shaft is connected with the steering mechanism of the vehicle. The shaft P is rotated by turning the wheel to steer the vehicle either to the right or to the left in a known manner.

The turn signal switch is provided with an outer annular casing 15 which is secured to the steering column S in any suitable fashion. The means shown for securing the casing to the steering column includes a semi-circular clamping ring section 16 which contracts a pair of contractile rings 18 and 19 to grip the steering column S by tightening the screws 17. The rings 18 and 19 are provided as bushings to accommodate the switch for different diameters of steering columns S. The casing has a cover annulus 20 which encloses the switch mechanism and a center flange 21 forming a part of the housing 15.

The switch has a stationary element in the form of an annulus 24 of dielectric material secured at the bottom of the casing 15. This stationary insulating ring 24 carries stationary contacts 25 and 26, one of which connects with a signal to indicate a right turn and the other connects with a signal to indicate a left turn. The stationary element 24 also carries a switch contact 27 lying between the contacts 25 and 26 adapted to be connected with an electrical circuit. Each contact is connected with one of the wires R which is adapted to lead to its respective signal circuit. The stationary element 24 has a portion cut away to form a segmental gap 28 to receive part of a double acting pawl later described. A spring pressed detent means 29 is carried by the stationary element and projects into the cut away portion 28.

The switch has a movable element 33, shown in Figure 5, which is received in the casing 15 and preferably in the upper portion thereof. The movable element or manually operable switch annulus 33 is also preferably a ring of dielectric material which is adapted to be oscillated manually within the casing to provide movement thereof for closing and opening the signal circuits. The movable element 33 has a recess which receives a switch blade or bridging means 34 so that it is shiftable manually to connect either the contact 25 or the contact 26 with the contact 27, as shown in Figures 8 and 9. In off or intermediate position, as shown in Figure 7, the switch contact blade 34 does not establish an electrical connection with either of the contacts 25 or 26.

Means are provided to releasably retain the switch annulus 33 and blade 34 in off or unconnected position. This means may be of any suitable kind, that particularly shown including a spring pressed button or detent 37 which is retained in a hole in the movable element 33 and the end of which engages a recess 38 provided in the casing 15 in off or unconnected position of the movable element. For all other positions of the movable element, the button 37 rides upon the inner surface of the casing.

The movable switch annulus 33 is provided with a handle 39 by which the car operator or driver may shift the switch blade 34 to the right or left to illuminate a signal to indicate a right or left turn. The handle projects through an opening in the casing 15 and the end edges 40 of the opening form stops which limit the movement of the annulus 33 in either direction from off position, so that the switch is closed for its respective turn signal or indicator.

Means are provided to automatically return the movable element or switch annulus 33 and its contact blade 34 to unconnected or off position upon return or retrograde rotation of the steering wheel after a turn of the vehicle has been completed. This means involves a return driving connection which is normally inoperative so long as the manually operable switch annulus 33 is in unconnected or off position. As soon as the annulus or movable element is moved to one of its connected positions, the driving connection is impelled to operative position to establish a driving connection between the steering wheel W and movable element 33 in return direction only, so that the movable element is restored to its off or unconnected position by the return movement of the steering wheel, whereupon the releasable detent means 37 engages in the recess 38 to retain the switch blade 34 in off position. The driving connection is biased to establish return movement of the movable element in one direction when it is shifted to one switch connected position, and is biased or impelled to establish a driving connection in the other direction when the movable element is moved to its other switch connected position. Any suitable driving connection operating in the above manner is contemplated.

The driving connection above referred to includes a segmental double acting pawl 45 carried upon a suitable pivot 46 which is mounted in the movable element 33. The pawl is of angular flanged construction so that one flange thereof receives the pivot 46 and the other flange depends into the segmental cut-out 28 of the stationary insulating ring 24 so that the depending flange is engaged by the spring pressed detent 29 carried by the stationary element 24. In unconnected or off position of the switch blade 34, the force of the spring pressed means 29 acts at right angles toward the axis of the pivot 46 so that the pawl is retained in neutral position. Each end of the depending flange of the pawl 45 also engages the inner circumference of the casing 15 so that the pawl is retained in inoperative or neutral position thereby, as well as by the spring means.

If the switch annulus 33 is moved to one of its connected positions, as illustrated in Figure 8, the pawl 45 is moved therewith, but the spring detent 29 remains stationary with the insulating ring 24 so that in this position the force of the detent tends to bias or impel the pawl to an angular position. However, the detent 29 is prevented from tilting the pawl by the inner circumference of a driving ring 49 against which the pawl rides. If the movable switch annulus 33 is moved to its other connected position, as shown in Figure 9, the detent 29 acts upon the other side of the pivot 46 for the pawl 45, but the pawl is normally prevented from tilting on its pivot 46 because its inner edge 47 engages the outer surface of the driving ring 49.

The driving ring 49 is mounted for rotation with the steering wheel W. Particularly, it is mounted for rotation around the center flange 21 of the casing 15. The upper edge of the driving ring 49 has a pair of lugs or projections 50 which are adapted to be received in recesses in the steering wheel W, as shown in Figure 1, so that the driving ring is adapted to be connected with the steering wheel and rotated thereby. The driving ring has a recess 53 which provides notch shoulders 51 and 52, the purpose of which will now be described.

In operation, when the shiftable switch annulus 33 is moved so that the switching blade 34 electrically connects the contacts 25 and 27, as shown in Figure 9, and illuminates the turn signal connected therewith, the pawl 45 is also shifted as shown in Figure 9, and the spring detent 29 biases or tilts the pawl in a clockwise direction. Normally the pawl 45 is prevented from tilting because the inner edge 47 of the pawl rides upon the outer surface of the driving ring 49 in the same fashion as shown in Figure 8. The operator turns the steering wheel W to the right, or in a clockwise direction, which turns the driving ring 49 in the same direction, whereupon the upper or inwardly directed end of the pawl drops into the recess 53 and is then cammed out of the recess by the notch shoulder 52 turning in a clockwise direction.

When the right turn has been completed, however, the operator straightens out the vehicle by rotating the steering wheel in a counter-clockwise direction, which rotates the driving ring 49 in a counter-clockwise direction, so that when the driving ring recess 53 reaches the pawl, the upper end thereof again drops into the recess. The notch shoulder 51 now abuts the end of the pawl and forces it in a counter-clockwise direction which moves the switch annulus 33 therewith until off position is reached, whereupon the spring detent 37 engages the detent recess 38 in the casing to hold the switcch blade 34 in unconnected position.

Means are provided to tilt the driving connection pawl 45 back to neutral or inoperative position upon return of the switch annulus 33 to its off or unconnected position. This means includes a recess on the inner surface of the casing 15 which provides a camming shoulder 55 at one end thereof and a similar camming shoulder 56 at the other end thereof. When the pawl 45 is moved in a counter-clockwise direction to return the switch annulus and contact blade 34 to off position, the lower or outwardly directed end of the pawl 45 engages the camming shoulder 55 which tilts the pawl in a counter-clockwise direction so that the upper or inwardly directed end thereof is tilted out of latched engagement from the driving ring notch 51 and hence the driving connection between the driving ring 49 and the pawl is broken upon the automatic return of the switch contact blade 34 to its off position. The driving ring 49 thereafter can continue its counter-clockwise rotation as many turns as needed to straighten the vehicle without affecting the movable element because the pawl is held in neutral position as shown in Figure 7.

It will be seen that the driving ring 49 and the outer casing 15 constitutes an annular track or guide-way in which the centrally pivoted pawl 45 is confined, and that the inner and outer arcuate edges of the pawl ride within the confining walls of the ring and casing. Note also that the length of the pawl is greater than the length of the camming recess 55, 56 and thus the pawl bridges over the two cams (Fig. 7). Accordingly, the car operator can shift the switch handle 39 to the right or left at any time to close the electrical circuit from 27 through either the right or left contacts 25 or 26.

Figure 2:
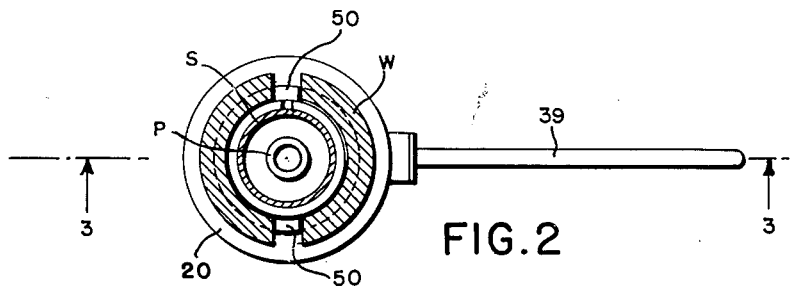
Figure 2 is a section, taken on line 2—2 of Figure 1, showing the connection between the steering wheel and the switch mechanism.

When the switch is at neutral or "off" position (Figs. 1, 2 and 7), the detent plunger 29 spring presses centrally against the depending flange of the pawl 45, i. e., right at or centrally toward the pivot 46. Thus, the pawl stands in a balanced position with its two ends overlying the cams 55 and 56. When the switch handle 39 and annulus 33 are shifted from neutral position (Fig. 8) to "on" position (Fig. 9), the pawl pivot 46 is then off-side the spring-pressed plunger 29 and the latter now imposes an unbalancing force against the pawl 45. Nevertheless, the pawl holds its concentric position by virtue of being confined within the annular track between the concentric ring means 15, 49. Not until the concentric recess 53 of the driving ring 49 comes around with the steering wheel W to the off-side or off-balance pawl 45, can the force of the detent plunger 29 perform its function of tilting the pawl to its eccentric position (Fig. 9) and attain a latching position with one or the other drive ring notches 51 or 52, by which the steering wheel may automatically actuate the switch and restore it to "off" position.

It is to be noted that the segmental cut-out 28 is formed in the outer periphery of the stationary insulating annulus 24 and is defined by a recessed edge disposed eccentrically to the axis of the switch assembly. Thus, the segmental recess is defined by the outer concentric casing wall 15 and an inner eccentric edge 28. One flange of the pawl 45 (Fig. 11) nests down in this pocket 28, while the other flange of said pawl nests within the flat segmental surface recess shown on the bottom surface of the movable switch annulus (Fig. 5) containing the pivot 46 centrally disposed in said surface recess. The switch annulus 33 of Fig. 5 shows its bottom surface facing up, and when assembled into the new switch combination the pivot 46 and the recess are turned downwardly into the switch housing 15.

The foregoing construction presents a compact and minimum parts assembly. The pawl 45 being in balance, by reason of the spring plunger 29 axis and the pivot 46 axis in a common plane, reduces friction and wear, since in normal operation (when the switch is neutral) the pawl does not bear under spring pressure against its track walls 15 or 49. The switch assembly is positive in operation because its concentric components nest together without means or likelihood of getting out of working order.

This invention is presented to fill a need for improvements in a turn signal switch. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing adapted for permanent connection with an automotive steering wheel and for turning continuously therewith, a segmental recess in the driving ring forming spaced notches, a segmental recess in the casing forming spaced cams, and an arcuate pawl pivotally mounted at its center on the switch annulus, the ends of the pawl engageable with the notches to establish a driving connection between the switch annulus and the driving ring in order to automatically break the signal circuit and engageable with the cams in order to disengage said driving connection.

2. An automotive turn signal switch comprising, in combination, an annular casing adapted to be concentrically anchored on the housing of a steering shaft, a manually operable switch annulus mounted in the casing and carrying a blade to make and break a signal circuit, a driving ring mounted in the casing adapted for connection with an automotive steering wheel and for turning therewith, a segmental recess in the driving ring forming spaced notches, a segmental recess in the casing forming spaced cams, an arcuate pawl of right-angle flange formation pivotally mounted at its center on the switch annulus by a pivot extending through one flange of the pawl, the ends of the pawl being engageable with the notches to establish a driving connection between the switch annulus and the driving ring to automatically break the signal circuit and also engageable with the cams to disengage said driving connection, and a spring-pressed plunger mounted in the casing and bearing against the other flange of the pawl.

3. An automotive turn signal switch comprising, in combination, an annular casing adapted to be concentrically anchored on the housing enclosing a steering shaft, a manually operable switch annulus mounted in the casing and carrying a switch blade to make and break a signal circuit, a driving ring mounted in the casing adapted for connection with an automotive steering wheel and for turning therewith, a segmental recess in the driving ring forming spaced notches, a segmental recess in the casing forming spaced cams, an arcuate pawl having a top flange and a side flange, a pivot carried by the switch annulus and the top flange of the pawl being mounted on said pivot, a spring-pressed plunger bearing against the side flange in the plane of the axis of the pivot when the switch blade is in neutral position, the ends of the pawl being engageable with the notches to establish a driving connection between the switch annulus and the driving ring to automatically break the signal circuit and thereafter engageable with the cams to disengage said driving connection.

4. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing adapted for connection with an automotive steering wheel and for turning therewith, a segmental recess in the driving ring forming spaced notches, a segmental recess in the casing forming spaced cams, an arcuate pawl having a top flange and a side flange and being longer than the segmental recess in the casing and overlying both spaced cams when the switch is in neutral position, a pivot carried by the switch annulus with the top flange of the pawl mounted on said pivot, a spring-pressed plunger bearing against the side flange in the plane of the pivot axis, the ends of the pawl engageable with the notches to establish a driving connection between the switch annulus and the driving ring to automatically break the signal circuit and thereafter engageable with the cams to disengage said driving connection.

5. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing adapted for connection with an automotive steering wheel and for turning therewith, a segmental recess in the driving ring forming spaced notches, a segmental recess in the casing forming cams spaced apart a shorter distance than the notches aforesaid, an arcuate pawl of a length greater than the distance between the spaced cams, a pivot carried by the switch annulus and the pawl being mounted centrally on said pivot, a spring-pressed plunger bearing against the pawl in the axial plane of the pivot, the ends of the pawl being engageable with the notches first to establish a driving connection from the driving ring to the switch annulus to automatically break the signal circuit and thereafter engageable with the cams to break said driving connection.

6. An automotive turn signal switch comprising, in combination, an annular casing adapted to be anchored on the housing of a steering shaft, a manually operable switch annulus mounted in the casing and carrying a switch blade to make and break a signal circuit, a driving ring mounted in the casing and turning with an automotive steering wheel, a segmental recess in the driving ring forming spaced notches, a segmental recess in the casing forming spaced cams, and an arcuate pawl having a side flange and a top flange pivotally mounted at its center on the switch annulus, the ends of the top flange being engageable with the notches to establish a driving connection between the switch annulus and the driving ring to automatically break the signal circuit, and the ends of the side flange being engageable with the cams in order to disengage said driving connection.

7. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing and adapted to be permanently connected with an automotive steering wheel for turning continuously therewith, a segmental recess in the driving ring forming spaced notches, a segmental recess in the casing forming spaced cams, and an arcuate pawl pivotally mounted at its center on the switch annulus, one end of the pawl being engageable with a notch by which the driving ring automatically breaks the signal circuit and moves the other end of the pawl against the cam to tilt the first end of said pawl out of the notch of the driving ring.

8. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing and adapted to be permanently connected with an automotive steering wheel for turning continuously therewith, the casing and driving ring aforesaid having spaced concentric walls forming an arcuate guideway in which the switch annulus aforesaid operates, an arcuate pawl confined in the guideway, a pivot mounted centrally of the pawl and carrying it on the switch annulus, the arcuate sides of the pawl riding along the walls of the guideway, shoulder notch means formed in the wall of the driving ring engageable with one end of the pawl, and cam means on the wall of the casing against which engages the other end of the pawl when the latter is moved in the guideway by the driving ring, whereby the cam means forces the pawl out of engagement with the driving ring.

9. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing and adapted to be permanently connected with an automotive steering wheel for turning continuously therewith, the casing and driving ring aforesaid having spaced concentric walls forming an arcuate guideway in which the switch annulus aforesaid operates, an arcuate pawl confined in the guideway, a pivot mounted centrally of the pawl and carrying it on the switch annulus, the arcuate sides of the pawl and also the switch annulus forming slidable bearing surfaces against the walls of the guideway, spaced notch means formed in the wall of the driving ring engageable with either end of the pawl, and cam means on the wall of the casing against which engages the other end of the pawl when the latter is moved in the guideway by the driving ring, whereby the cam means forces the pawl out of engagement with the driving ring.

10. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing and turning with an automotive steering wheel, the casing and driving ring aforesaid having spaced concentric walls forming an arcuate guideway in which the switch annulus aforesaid operates, an arcuate pawl having a top flange and a side flange confined in the guideway, a recess formed in the switch annulus in which the top flange of the pawl is nested, a segmental cut-out formed in the casing under the switch annulus into which depends the side flange of the pawl, a pivot mounted centrally of the top flange of the pawl and carrying it on the switch annulus; the arcuate sides of the pawl riding as a bearing surface along the walls of the guideway, and also the sides of the switch annulus riding as bearing surfaces against the walls of the guideway; spaced notches formed in the wall of the driving ring engageable with an end of the pawl, spaced cams on the wall of the casing against which engages the other end of the pawl when it and the switch annulus is moved in the guideway by the driving ring, whereby the cam means forces the pawl out of engagement with the driving ring.

11. An automotive turn signal switch comprising, in combination, an annular casing adapted to be concentrically anchored on the housing of a steering shaft, a manually operable switch annulus mounted in the casing and carrying a switch blade to make and break a signal circuit, a driving ring mounted in the casing and adapted to be permanently connected with an automotive steering wheel for turning continuously therewith, the casing and driving ring having spaced concentric walls forming an arcuate guideway in which the switch annulus aforesaid operates, an arcuate pawl confined in the guideway, a pivot mounted centrally of the pawl and carrying said pawl on the switch annulus, the arcuate sides of the pawl riding along the walls of the guideway, two shoulder notch means spaced apart and formed in the wall of the driving ring engageable with one end of the pawl, two cam means spaced apart on the wall of the casing against one of which the other end of the pawl engages when the latter is moved in the guideway by the driving ring, whereby one of the cam means forces the pawl out of engagement with the driving ring, and the two cam means being spaced apart a shorter distance than the spacing between the two shoulder notch means.

12. An automotive turn signal switch comprising, in combination, an annular casing adapted to be concentrically anchored on the housing of a steering shaft, a switch annulus having a handle and being mounted in the annular casing and carrying a switch blade movable therewith to make and break an electrical connection with feed-circuit stationary contacts, a driving ring mounted in the annular casing and adapted to be permanently connected with an automotive steering wheel for turning continuously therewith, the annular casing and driving ring aforesaid constituting spaced concentric walls forming an arcuate guideway in which the switch annulus aforesaid is oscillated in one direction by the handle to make contact and in the reverse direction automatically by the driving ring to break contact, an arcuate pawl confined in the guideway, a pivot carried by the switch annulus and the pawl being pivotally confined on said pivot, the arcuate sides of the pawl riding along the walls of the guideway and being restrained against pivotal movement, spaced-apart shoulder notch means formed in the wall of the driving ring, one shoulder notch means engageable with one end of the pawl, and spaced-apart camming means formed in the wall of the casing, one of the camming means engageable against the other end of the pawl after the latter has been moved automatically in the guideway by the driving ring, whereby the cam means forces the pawl out of engagement with the driving ring to leave the switch disconnected from the feed-circuit contacts during normal operation of the steering wheel.

BASIL J. YANCHENKO.
HARRY A. STEELE.